(12) United States Patent
Kurematsu et al.

(10) Patent No.: US 11,181,179 B2
(45) Date of Patent: Nov. 23, 2021

(54) SPROCKET AND DRIVE MECHANISM

(71) Applicant: TSUBAKIMOTO CHAIN CO., Osaka (JP)

(72) Inventors: Yuji Kurematsu, Osaka (JP);
Kazuyuki Ebinuma, Osaka (JP);
Tsuyoshi Kabai, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 324 days.

(21) Appl. No.: 16/364,819

(22) Filed: Mar. 26, 2019

(65) Prior Publication Data
US 2019/0301585 A1    Oct. 3, 2019

(30) Foreign Application Priority Data

Mar. 30, 2018  (JP) .............................. JP2018-068669

(51) Int. Cl.
*F16H 55/30*    (2006.01)
(52) U.S. Cl.
CPC ....... *F16H 55/30* (2013.01); *F16H 2055/306* (2013.01)
(58) Field of Classification Search
CPC ...... F16H 55/30; F16H 7/06; F16H 2055/306; F16G 13/04; F01L 1/022
USPC .................................................. 474/152, 141
See application file for complete search history.

(56) References Cited

U.S. PATENT DOCUMENTS

| 320,734 | A | * | 6/1885 | Whiteley | .................. | F16H 7/06 |
| | | | | | | 474/148 |
| 698,991 | A | * | 4/1902 | Morse | ..................... | F16H 55/30 |
| | | | | | | 474/152 |
| 3,020,095 | A | * | 2/1962 | Backhaus | .............. | B62D 55/12 |
| | | | | | | 305/197 |
| 3,448,629 | A | * | 6/1969 | Norcross | ................... | F16H 7/06 |
| | | | | | | 474/148 |
| 3,495,468 | A | * | 2/1970 | Griffel | ..................... | F16H 55/30 |
| | | | | | | 474/157 |
| 3,583,250 | A | * | 6/1971 | Kongelka | ............... | F16H 7/023 |
| | | | | | | 474/133 |
| 4,016,772 | A | * | 4/1977 | Clemens | ................ | B62D 55/12 |
| | | | | | | 474/156 |

(Continued)

FOREIGN PATENT DOCUMENTS

| JP | 2008-309171 A | 12/2008 |
| JP | 2009-156320 A | 7/2009 |

OTHER PUBLICATIONS

Office Action dated Oct. 12, 2021, issued in counrtepart JP Application No. 2018-068669, with English Translatioon. (8 pages).

*Primary Examiner* — Henry Y Liu
(74) *Attorney, Agent, or Firm* — Westerman, Hattori, Daniels & Adrian, LLP

(57) ABSTRACT

To provide a sprocket that reduces the influence of tension fluctuations concurrent with load torque variations, that suppresses noise and vibration, and that prevents an increase in tension fluctuations, noise, and vibration even when the chain tension is low and the load torque is small, or in regions where a chain and the sprocket engage without being affected by the tension. The sprocket has a plurality of teeth mating with the chain that are provided with an equal pitch therebetween, and that include teeth with different working pressure angles relative to the chain.

5 Claims, 2 Drawing Sheets

(56) References Cited

U.S. PATENT DOCUMENTS

| | | | | |
|---|---|---|---|---|
| 4,116,081 A * | 9/1978 | Luttrell | B62D 55/12 | 474/156 |
| 4,148,225 A * | 4/1979 | Redmond, Jr. | F16H 7/023 | 474/148 |
| RE30,018 E * | 6/1979 | Clemens | B62D 55/12 | 474/152 |
| 4,527,987 A * | 7/1985 | Berchem | C22C 38/44 | 148/224 |
| 4,738,653 A * | 4/1988 | Riewerts | F16H 7/06 | 222/615 |
| 4,758,209 A * | 7/1988 | Ledvina | F16G 13/04 | 474/156 |
| 4,758,210 A * | 7/1988 | Ledvina | F16G 13/04 | 474/212 |
| 4,759,740 A * | 7/1988 | Cradduck | F16G 13/04 | 474/212 |
| 5,022,280 A * | 6/1991 | Boiko | F16H 55/0826 | 74/462 |
| 5,236,400 A * | 8/1993 | Tsuyama | F16G 13/04 | 474/217 |
| 5,733,214 A * | 3/1998 | Shiki | F01L 1/02 | 474/110 |
| 5,976,045 A * | 11/1999 | Young | F16H 55/30 | 474/160 |
| 6,074,507 A * | 6/2000 | Sukenik | B31F 1/2863 | 156/205 |
| 6,155,943 A * | 12/2000 | Ledvina | F16H 7/06 | 160/152 |
| 6,179,741 B1 * | 1/2001 | Young | F16H 7/06 | 474/156 |
| 6,277,045 B1 * | 8/2001 | Waters Scheuer | F01L 1/02 | 474/152 |
| 6,317,989 B1 * | 11/2001 | Forsberg | B27B 17/08 | 30/384 |
| 6,325,735 B1 * | 12/2001 | Kanehira | F16G 13/04 | 474/206 |
| 6,428,436 B1 * | 8/2002 | Woyach | F16H 55/30 | 474/152 |
| 6,736,744 B1 * | 5/2004 | Wigsten | F16H 55/30 | 474/152 |
| 6,761,657 B2 * | 7/2004 | Young | F16H 7/06 | 474/152 |
| 7,044,875 B2 * | 5/2006 | Gajewski | F01L 1/02 | 474/148 |
| 7,094,170 B2 * | 8/2006 | Young | F16G 13/04 | 474/153 |
| 7,125,356 B2 * | 10/2006 | Todd | F16H 55/30 | 474/152 |
| 7,128,673 B2 * | 10/2006 | Kubo | F16H 55/30 | 474/152 |
| 7,232,391 B2 * | 6/2007 | Gajewski | F01L 1/02 | 474/141 |
| 7,442,139 B2 * | 10/2008 | Kubo | B65G 23/06 | 474/152 |
| 7,493,880 B2 * | 2/2009 | Gajewski | F01L 1/022 | 123/90.31 |
| 7,534,182 B2 * | 5/2009 | Sonoda | F16H 55/08 | 474/152 |
| 7,635,314 B2 * | 12/2009 | Kubo | F16H 7/06 | 474/152 |
| 7,654,925 B2 * | 2/2010 | Todd | F16H 55/30 | 474/152 |
| 7,691,020 B2 * | 4/2010 | Sakura | F16H 55/30 | 474/156 |
| 7,720,650 B2 * | 5/2010 | Gajewski | F01L 1/02 | 703/1 |
| 7,857,720 B2 * | 12/2010 | Lacy | F01L 1/024 | 474/141 |
| 8,007,387 B2 * | 8/2011 | Young | F16G 13/04 | 474/157 |
| 8,066,601 B2 * | 11/2011 | Nakano | F02B 67/06 | 474/141 |
| 8,342,993 B2 * | 1/2013 | Gajewski | F01L 1/022 | 474/141 |
| 8,430,775 B2 * | 4/2013 | Todd | F16H 7/06 | 474/148 |
| 8,628,440 B2 * | 1/2014 | Young | F16G 13/04 | 474/157 |
| 8,641,565 B2 * | 2/2014 | Young | F16H 7/06 | 474/157 |
| 8,668,609 B2 * | 3/2014 | Young | F16G 13/04 | 474/157 |
| 8,672,786 B2 * | 3/2014 | Young | F16H 55/08 | 474/206 |
| 8,708,849 B2 * | 4/2014 | Young | F16H 55/30 | 474/152 |
| 9,377,082 B2 * | 6/2016 | Young | F16H 55/08 | |
| 9,500,271 B2 * | 11/2016 | Yokoyama | F16H 55/30 | |
| 10,578,201 B2 * | 3/2020 | Reiter | B62M 1/36 | |
| 10,907,721 B2 * | 2/2021 | Todd | F16H 55/30 | |
| 2002/0058561 A1 * | 5/2002 | Kanehira | F16G 13/04 | 474/213 |
| 2003/0087714 A1 * | 5/2003 | Todd | F16H 55/30 | 474/156 |
| 2003/0104886 A1 * | 6/2003 | Gajewski | F01L 1/022 | 474/87 |
| 2008/0085799 A1 * | 4/2008 | Lacy | F01L 1/024 | 474/141 |
| 2008/0312017 A1 * | 12/2008 | Young | F16H 7/06 | 474/148 |
| 2008/0312019 A1 | 12/2008 | Ogo et al. | | |
| 2009/0143179 A1 * | 6/2009 | Penner | F16G 13/04 | 474/157 |
| 2009/0149287 A1 * | 6/2009 | Gajewski | F01L 1/022 | 474/141 |
| 2009/0170648 A1 * | 7/2009 | Nakano | F16H 55/30 | 474/141 |
| 2010/0069187 A1 * | 3/2010 | Young | F16H 7/06 | 474/157 |
| 2010/0227720 A1 * | 9/2010 | Mehta | F16H 55/30 | 474/155 |
| 2011/0183799 A1 * | 7/2011 | Young | F16H 55/30 | 474/148 |
| 2011/0245002 A1 * | 10/2011 | Young | F16H 7/06 | 474/157 |
| 2014/0200106 A1 * | 7/2014 | Young | F16H 7/06 | 474/148 |

* cited by examiner

SPROCKET AND DRIVE MECHANISM

BACKGROUND OF THE INVENTION

1. Field of the Invention

The present invention relates to a sprocket having a plurality of teeth that mate with a chain, and to a drive system.

2. Description of the Related Art

Drive systems with a chain passing over sprockets having a plurality of teeth on the circumferential surface of their main bodies have been commonly used as a mechanism for reliably transmitting rotation.

While the rotational force is reliably transmitted from one sprocket to another at given timing as the teeth of the sprocket mate with the chain, noise and vibration inevitably accompany the sprocket/chain engagement.

For a drive system where the load torque varies periodically with the rotation, a sprocket that suppresses noise and vibration by alleviating the influence of tension fluctuations concurrent with the load torque variations is known. In the sprocket, in order to reduce tension fluctuations concurrent with periodic variations of the load torque, a plurality of teeth are arranged so as to form a phase variation pattern wherein the phase of engagement between the teeth and the chain is alternately advanced and retarded relative to a zero position where equidistant teeth would be in phase with the chain (see, for example, Japanese Patent Application Laid-open No. 2009-156320).

SUMMARY OF THE INVENTION

With the known sprocket, it is possible to suppress noise caused by vibration of the chain by reducing tension fluctuations. However, because of the periodic nature of the load torque variation, generation of order noises corresponding to the periods is inevitable.

There are also possibilities of tension fluctuations becoming larger, or of increased noise and vibration, contrary to the intention, if there is a shift in the phase of the load torque variation, or when resonance occurs depending on the relationship between the sprocket rpm and the natural frequency of the chain.

When the chain tension is low and the load torque is small, or in regions where the chain and sprocket engage without being affected by the tension, the plurality of teeth of the sprocket are arranged so as to form a phase variation pattern. Due to this arrangement, the shape of the sprocket may cause tension fluctuations of the chain, vibration, and noise, contrary to the intension.

An object of the present invention is to solve these problems and to provide a sprocket that reduces the influence of tension fluctuations concurrent with load torque variations, that suppresses noise and vibration, and that suppresses an increase in tension fluctuations, noise, and vibration even when the chain tension is low and the load torque is small, or in regions where a chain and the sprocket engage without being affected by the tension.

The present invention achieves the above object by providing a sprocket having a plurality of teeth that mate with a chain, the plurality of teeth being provided with an equal pitch therebetween, and including teeth with different working pressure angles relative to the chain.

According to the sprocket set forth in claim 1, the plurality of teeth are provided with an equal pitch therebetween, and include teeth with different working pressure angles relative to the chain. As the seating point changes with the load torque in accordance with the working pressure angle, the pitch line of the mating chain changes.

This pitch line change becomes more evident as the load torque increases. It is thus possible to dynamically deal with torque variations to reduce the influence of tension fluctuations, whereby noise and vibration can be suppressed.

When the chain tension is low and the load torque is small, or in regions where the chain and sprocket engage without being affected by the tension, the difference in working pressure angle hardly causes the pitch line to change. Thus, tension fluctuations, vibration, and noise originating from the sprocket can be suppressed because the teeth are provided with an equal pitch therebetween.

According to the sprocket set forth in claim 2, the plurality of the teeth have a variation pattern in which the working pressure angles between the plurality of the teeth and the chain change continually decrease or increase in a circumferential direction. In this way, the timing at which the period of the load torque variation and the period of the variation pattern fall out of phase can be changed smoothly, whereby generation of order noises can be further suppressed.

According to the sprocket set forth in claim 3, the variation pattern contains a wavelength identical to that of a main torque variation. In this way, the influence of torque variations, which are the main cause of noise and vibration, can be effectively alleviated.

According to the sprocket set forth in claim 4, the plurality of teeth have seating contact surfaces provided with an equal pitch therebetween. In this way, tension fluctuations, vibration, and noise originating from the sprocket, when the chain tension is low and the load torque is small or in regions where the chain and sprocket engage without being affected by the tension, can be further suppressed.

DESCRIPTION OF THE PREFERRED EMBODIMENT

The sprocket of the present invention may have any specific configuration as long as it is a sprocket including a plurality of teeth that mate with a chain, the plurality of teeth being provided with an equal pitch therebetween and including teeth with different working pressure angles relative to the chain.

The chain passed over the sprocket may be any chain such as a silent chain, roller chain, bushing chain and the like, or any other flexible drive member such as a timing belt that is configured to mesh with the teeth of a sprocket.

Hereinafter, the sprocket of the present invention will be described with reference to the accompanying drawings.

Figure 1:
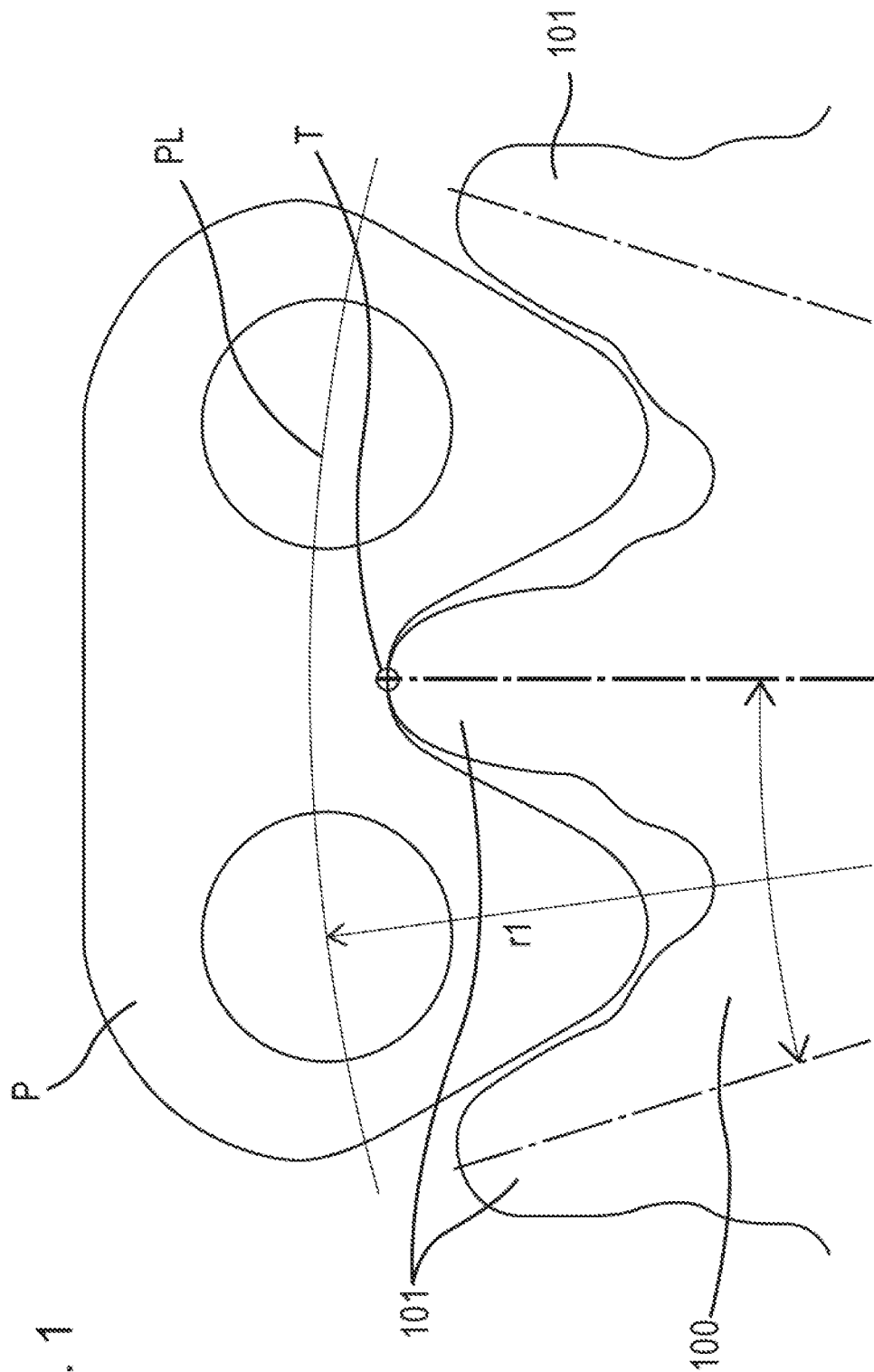
FIG. 1 is an illustrative diagram showing a plate position under no load of a chain passing over a sprocket according to one embodiment of the present invention.

As shown in FIG. 1, when the chain is mated with the sprocket 100 under no load, a plate P of the chain sits on a tooth 101 of the sprocket 100, with a crotch portion being at the top, which is a seating point T, of the tooth 101.

At this time, the radius r1 of the sprocket 100 to the chain pitch line PL becomes minimum.

Since the teeth 101 of the sprocket 100 are provided with an equal pitch, when the load is small, the plate P of the chain sits on the tooth with the crotch portion being at the seating point T at the top of the tooth 101 so that the radius of the sprocket 100 to the pitch line PL is r1. Thus there is less unevenness in the rotation of the chain and transmission efficiency can be increased, and tension fluctuations originating from the sprocket 100, and resultant vibration and noise can be suppressed.

Figure 2:
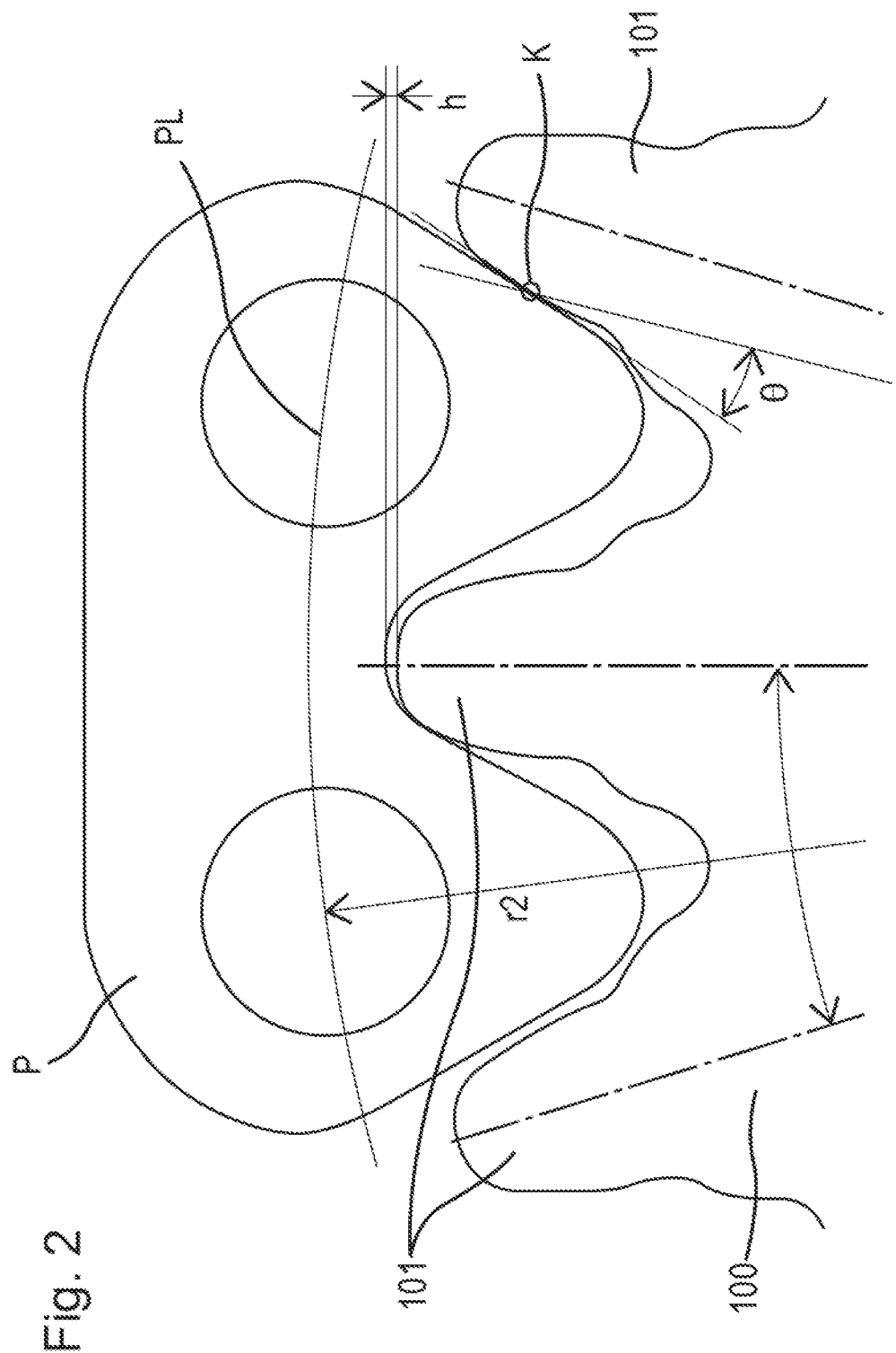
FIG. 2 is an illustrative diagram showing a plate position of a loaded chain passing over the sprocket according to one embodiment of the present invention.

When the chain tension rises, an outer side portion of the plate P makes and stays in contact with the tooth 101 of the sprocket 100 at a working point K to transmit torque as shown in FIG. 2. The chain plate P does not make contact with the tooth at the seating point T, which it does when no load is applied, and is lifted by h in the radially outward direction of the sprocket 100, so that the radius of the sprocket 100 to the pitch line PL is increased to r2.

The increased radius to the pitch line PL varies in accordance with the chain tension, as well as with the working pressure angle θ at the working point K between the chain plate P and the tooth 101.

The sprocket of the present invention has the teeth 101 provided with an equal pitch therebetween, and includes teeth with different working pressure angles θ, so that the radius of the sprocket 100 to the pitch line PL changes at random when loaded. In this way, the order noises can be reduced as with when the sprocket has randomly varying mating pitch.

The working pressure angles θ may change gradually in accordance with the angular position with a variation pattern wherein the angles continuously decrease or increase in the circumferential direction. Thereby, tension fluctuations can be reduced as with when the mating pitch is varied in accordance with the chain tension fluctuations. The variation pattern may contain a wavelength identical to that of the main torque variation, which will be particularly effective in an application where the cause of torque variations is known beforehand such as an engine or the like.

In the description above, the plate P of the chain sits on the sprocket with the crotch portion being seated at the top, which is the seating point T, of a tooth 101 of the sprocket 100, when not loaded. Instead, the tooth tip of the chain plate P may sit on a tooth root of the sprocket 100, or a flank surface in the crotch portion of the plate P may sit on a side face of the tooth 101 of the sprocket 100, or both outer flank surfaces of the plate P may sit on side faces of the teeth 101 of the sprocket 100 on both sides.

While it has been described that, when loaded, the outer side portion of the plate P stays in contact with the tooth 101 of the sprocket 100 at the working point K as torque is transmitted, a side face in the crotch portion of the plate P may stay in contact with the side face of the tooth 101 of the sprocket 100 at the working point K when torque is transmitted.

What is claimed is:

1. A sprocket comprising a plurality of teeth that mate with a chain, the plurality of teeth being provided with an equal pitch angle therebetween and a same radius at a seating point of the chain under a low load, and including teeth with different working pressure angles relative to the chain under a high load that is higher than the low load.

2. The sprocket according to claim 1, wherein the plurality of the teeth have a variation pattern in which the working pressure angles between the plurality of the teeth and the chain change gradually in accordance with an angular position and continually decrease or increase in a circumferential direction.

3. The sprocket according to claim 1, wherein the variation pattern contains a wavelength identical to that of a main torque variation.

4. The sprocket according to claim 1, wherein the plurality of teeth have seating contact surfaces provided with an equal pitch therebetween.

5. A drive mechanism comprising the sprocket according to claim 1, a shaft to which the sprocket is attached, and a chain passing over the sprocket.

\* \* \* \* \*